UNITED STATES PATENT OFFICE.

HERBERT C. REED, OF STAMFORD, CONNECTICUT.

METHOD OF MANUFACTURING OXALIC ACID.

1,310,713.  Specification of Letters Patent.  Patented July 22, 1919.

No Drawing.   Application filed September 23, 1915. Serial No. 52,224.

*To all whom it may concern:*

Be it known that I, HERBERT C. REED, a citizen of the United States, and resident of Stamford, county of Fairfield, and State of Connecticut, have invented certain new and useful Improvements in Methods of Manufacturing Oxalic Acid, of which the following is a specification.

My invention relates to the manufacture of oxalic acid ($H_2C_2O_4$) and salts of oxalic acid, and consists in the new and improved method for the production of the same as hereinafter described and claimed.

In the chemical manufacture of paper pulp, certain sulfite, sulfate and alkali waste liquors are obtained which contain various organic materials having at the present time no well defined chemical formula, but are usually considered a complex mixture of carbohydrates, ligno-celluloses, organic sulfo-compounds, etc. These various waste liquors differ in kind and amount of the various complexes due to differences in the many processes of paper pulp manufacture.

My invention consists generally in the treatment of such "waste liquor" by the chemical action commonly known as "alkali fusion," such as is produced by the action at high temperatures of alkalis, such as sodium hydrate (NaOH), potassium hydrate (KOH), and the mixtures of said potassium and sodium hydrates, to produce from the organic matter in the liquor oxalic acid and its salts.

The steps of my improved process, consist in taking this waste liquor, containing in its original form considerable water, and evaporating it to a dry or semi-dry residue. To this residue I then add sufficient suitable alkali, preferably sodium hydrate, to provide a considerable excess of alkalinity, say about 400 pounds of sodium hydrate to 100 pounds of such residue. This mixture is then exposed in thin layers to a temperature preferably approximating 250° C. for a period which will permit the completion of the reaction, viz., approximately six hours. I then permit the mixture to cool, and then add sufficient water to dissolve out the excess of sodium hydrate and soluble organic matter, leaving in the residue oxalic acid in the form of a salt, commonly known as sodium oxalate ($Na_2C_2O_4$). I then add sufficient water to this residue to dissolve the sodium oxalate, and precipitate the oxalic acid as an insoluble oxalate, by means of lime (CaO), or a salt of calcium, and allow the precipitate to settle. I then draw off the supernatant liquor and add sufficient sulfuric acid to decompose the calcium oxalate, or insoluble oxalate, and to provide an excess of sulfuric acid. I then permit the mixture to settle and draw off the supernatant liquor and by evaporation crystallize the contained oxalic acid, which may be purified, if necessary, by recrystallization in the usual manner.

The reactions represented in the process as described are as follows:—sodium oxalate and other oxalates being formed by the fusion of the waste liquor with sodium hydrate, according to the process described, reacts with lime, or a salt of calcium to form calcium oxalate as follows:

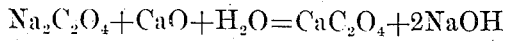

The calcium oxalate ($CaC_2O_4$) thus formed, reacts with sulfuric acid to form oxalic acid as follows:—

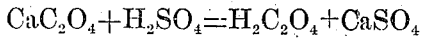

Oxalic acid is then crystallized out as described, giving the crystalline oxalic acid of the formula $H_2C_2O_4.2H_2O$.

I do not confine myself to the relative amounts of waste liquor and alkali used, nor to the form of the alkali, nor to the exact temperature employed, nor to the time involved. Neither do I confine myself to the use of lime or a salt of calcium, as other materials which precipitate oxalic acid may be employed. Nor do I confine myself to the use of sulfuric acid as a means of splitting up the calcium oxalate to set free the oxalic acid, as any other material that will effect the same result may be used, such as carbon dioxid gas ($CO_2$), etc. Neither do I confine myself to the ultimate production of oxalic acid, but also claim the production of any salt of oxalic acid, or a mixture of salts of oxalic acid.

Having thus described my invention, what I claim and desire to secure by Letters Patent is:—

1. In the process of manufacturing oxalic acid from waste liquor from the chemical manufacture of paper, the steps which consist in first subjecting such liquor to evaporation until a substantially dry residue is produced, then subjecting the same to alkali fusion with a large excess of caustic alkali in a highly concentrated form, then subjecting the resultant mixture to an elevated temperature at approximately 250° C. for a sufficient time to form an oxalate compound by chemical reaction between the respective ingredients of the mixture, then effecting a cooling of the mixture, then dissolving the excess of alkaline compound to form an alkaline solution without dissolving said oxalate, then separating the oxalate residue from the alkaline solution.

2. In the process of manufacturing oxalic acid from waste liquor from the chemical manufacture of paper, the steps which consist in first subjecting such liquor to evaporation until a substantially dry residue is produced, then subjecting the same to alkali fusion with several hundred per cent. of caustic alkali in a highly concentrated form, then subjecting the resultant mixture in a thin layer to an elevated temperature at approximately 250° C., for a period of several hours to form an oxalate compound by chemical reaction between the respective ingredients of the mixture, then separating the oxalate compound from the excess alkali.

Signed at New York, in the county of New York and State of New York, this 21st day of Sept., 1915.

HERBERT C. REED.